United States Patent [19]

Hurwitz et al.

[11] 4,093,567

[45] June 6, 1978

[54] AMINATED CROSSLINKED COPOLYMERS OF BIS(CHLOROMETHYL) STYRENE WHICH EXHIBIT IMPROVED ANION EXCHANGE PROPERTIES

[75] Inventors: Marvin J. Hurwitz, Elkins Park; Noyes L. Avery, Oreland, both of Pa.

[73] Assignee: Rohm and Haas Company, Philadelphia, Pa.

[21] Appl. No.: 759,950

[22] Filed: Jan. 17, 1977

[51] Int. Cl.² .................. C08F 2/18; C08F 12/18; C08F 12/34; C08F 19/22
[52] U.S. Cl. .................. 260/21 E; 260/63 BB; 260/67 UA; 260/79.3 M; 260/79.7; 526/17; 526/52.2; 526/258; 526/274; 526/279; 526/283; 526/293
[58] Field of Search .......... 260/2.1 E; 526/17, 49, 526/293, 258

[56] References Cited

U.S. PATENT DOCUMENTS

| 2,992,544 | 7/1961 | McMaster | 526/293 |
|---|---|---|---|
| 3,359,239 | 12/1967 | Koch et al. | 526/293 |
| 3,843,566 | 10/1974 | Barrett | 526/284 |
| 4,025,705 | 5/1977 | Corte et al. | 526/17 |

FOREIGN PATENT DOCUMENTS

| 321,523 | 4/1972 | U.S.S.R. | 526/346 |
|---|---|---|---|

*Primary Examiner*—Joseph L. Schafer
*Assistant Examiner*—Peter F. Kulkosky
*Attorney, Agent, or Firm*—John E. Taylor, III

[57] ABSTRACT

This invention relates to certain novel anion exchange resins and the method of making them. It relates more particularly to aminated cross-linked polymers of bis(-chloromethyl(styrene which exhibit improved anion exchange properties, and to the method of preparing the same.

17 Claims, No Drawings

AMINATED CROSSLINKED COPOLYMERS OF BIS(CHLOROMETHYL) STYRENE WHICH EXHIBIT IMPROVED ANION EXCHANGE PROPERTIES

The preparation of anion exchange resins from copolymers of divinylbenzene or other polyvinylaromatic hydrocarbons with polymerizable monovinylaromatic compounds is known. These resins typically are halogenated following polymerization, by contacting the resin with a halogen in the presence of halogenation catalysts, which promote substitution of halogen for hydrogen attached to carbon atoms on the aromatic nuclei. As is indicated by McMaster, et al, in U.S. Pat. Nos. 2,631,999, 2,632,000 and 2,632,001, this halogenation reaction is accompanied, at least to some extent, by substitution of halogen atoms on aromatic nuclei of the copolymer, and also by substitution of halogen atoms in the polymer chain. Such halogenation of the polymer chain is thought to cause instability of the anion exchange resin.

Treatment of the halogenated resins with amines to form the anion exchange resins themselves is also known; see the previously cited patents of McMaster et al. This amination causes a reaction between the substitute halogen atoms, especially those attached to alkyl substituents of the aromatic nuclei, and the amines to form alkylamine halide groups with anion exchange activity. Since substitution of more than one halogen atom on the same carbon of the alkyl substituent reduces halogen reactivity with the amines, and since such multiple halogen substitution is expected to occur, at least to some extent, during halogenation of the resin, the anion exchange activity of the resin tends to be lower than that predicted from the degree of halogenation.

The use of bis(chloromethyl)styrene in the preparation of polymers is known; UK Pat. No. 1,093,472 describes a process for incorporating this monomer into polymers made from ethylenically unsaturated monomers. The bis(chloromethyl)styrene is used merely to increase the average molecular weight of the polymers.

It has now been discovered that preparing anion exchange resins from copolymers of bis(chloromethyl)styrene with polyethylenically unsaturated monomers, without further halogenation of the copolymer, not only eliminates the deleterious effects of halogen substitution on the aromatic nuclei and on the polymer chain, but also produces resins with increased anion exchange capacity over current commercial halogenated resins.

Typical anion exchange capacities of known resins are about 4.0 to 4.4 milliequivalents per gram of strong-base resin, and up to about 5.0 or 5.1 milliequivalents per gram of weak-base resin. Resins of the present invention, which may be made in gel (gellular) or macroreticular form, possess anion exchange capacities of about 5.0 milliequivalents per gram of strong-base resin, and about 6.5 milliequivalents per gram of weak-base resin. They also show excellent physical stability, i.e., low content of cracked resin beads, when cycled between the hydrous and the dry states.

The resins of the present invention are derived from copolymers comprising crosslinked poly(bis(chloromethyl)styrene) wherein the crosslinker is a polyethylenically unsaturated monomer. These copolymers may be prepared by polymerizing a mixture of bis(chloromethyl)styrene and the polyethylenically unsaturated monomer in the presence of a polymerization catalyst, and also in the presence of additives that promote the formation of resin beads in the desired physical form when prepared by the well-known methods of suspension polymerization, e.g., Barrett, U.S. Pat. No. 3,843,566. The mixture of monomers may contain from about 99.5% to about 50% by weight of bis(chloromethyl)styrene and from about 0.5% to about 50% by weight of the polyethylenically unsaturated monomer; a preferred range of the polyethylenically unsaturated monomer is from about 0.5% to about 30% by weight of said monomer. Since an addition polymerization is involved, the percentage of each monomer in the monomer mixture is essentially the same as the percentage of the corresponding polymer in the copolymer. The reaction is conducted at temperatures from 40° to 120° C., and at atmospheric, superatmospheric or subatmospheric pressure; the typical reaction temperatures are between 50° and 100° C, and the reaction product is a benzene-insoluble copolymer, containing from about 0.5% to about 50% by weight of crosslinker, and preferably from about 0.5% to about 30% by weight of crosslinker. To produce the quaternary ammonium anion-exchange resin itself, the copolymer is aminated with a tertiary amine, and to produce the weakly basic resin it is aminated with a secondary amine. The amination reaction may be illustrated by the following, in which R' may be hydrogen or an alkyl group containing 1–5 carbon atoms, and R" and R'" are alkyl groups containing 1–5 carbon atoms; said alkyl groups being the same or different from one another or an alkyl group represented by R':

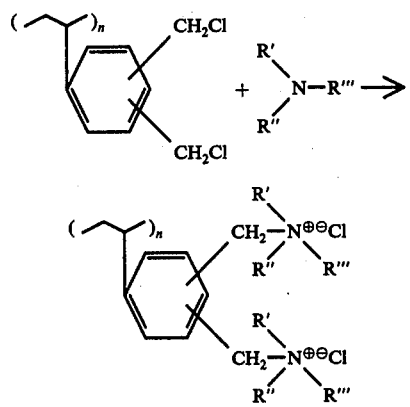

The polyethylenically unsaturated monomer promotes crosslinking in the polymer; it may be a single chemical compound or a mixture of compounds, and may be exemplified by, but not limited to, the following illustrative materials: divinylbenzene, divinylpyridine, divinylnaphthalenes, diallyl phthalate, ethylene glycol diacrylate, ethylene glycol dimethacrylate, trimethylol propane trimethacrylate, divinyl sulfone, polyvinyl or polyallyl ethers of glycol, of glycerol, of pentaerythritol, of diethylene glycol, of monothio- or dithio-derivatives of glycols, and of resorcinol, divinyl ketone, divinyl sulfide, allyl acrylate, diallyl maleate, diallyl fumarate, diallyl succinate, diallyl carbonate, diallyl malonate, diallyl oxalate, diallyl adipate, diallyl sebacate, divinyl sebacate, diallyl tartrate, diallyl silicate, triallyl carballylate, triallyl aconitate, triallyl citrate, triallyl phosphate, N,N'-methyleneacrylamide, N,N'- methylenedimethacrylamide, N,N'-ethylenediacrylamide, trivinylbenzene, trivinylnaphthalenes, and polyvinylanthracines.

Examples of preferred polyethylenically unsaturated crosslinkers include divinylpyridine, divinylnaphthalenes, divinylbenzene, trivinylbenzene, alkyl divinylbenzenes having from 1 to 4 alkyl groups of 1 to 2 carbon atoms substituted in the benzene nucleus, and alkyl trivinylbenzenes having 1 to 3 alkyl groups of 1 to 2 carbon atoms substituted in the benzene nucleus.

Examples of typical polymerization catalysts useful for promoting the reaction between bis(chloromethyl)styrene and the polyethylenically unsaturated monomer include benzoyl peroxide, tertiary butyl hydroperoxide, cumene peroxide, tetralene peroxide, acetyl peroxide, lauroyl peroxide, caproyl peroxide, tertiary butyl perbenzoate, tertiary butyl diperphthalate, methyl ethyl ketone peroxide, hydrogen peroxide, potassium persulfate and ammonium persulfate.

The secondary and tertiary amines useful for amination of the polymer have as substituents two or three of the same or different alkyl groups, each group containing 1–5 carbon atoms. These amines are exemplified by dimethylamine, trimethylamine, diethylamine, triethylamine, di-n-propylamine, tri-n-propylamine, di-n-butylamine, triisobutylamine, diisoamylamine, tri-n-amylamine, methylethylamine and dimethylethylamine.

It is well know in the art to prepare polymers from mixtures of monomers; in the present invention polymers may be prepared from mixtures of monoethylenically unsaturated monomers in which bis(chloromethyl)styrene comprises from about 5% to about 99.5% by weight of said mixtures. The mixed monomers are crosslinked with one or more polyethylenically unsaturated monomers, just as when the monoethylenically unsaturated monomer is bis(chloromethyl)styrene alone.

Inclusion of monoethylenically unsaturated monomers other than bis(chloromethyl)styrene in the monomer mix allows control of the number of active sites available for amination, and thereby allows control of the specific anion exchange capacity of the aminated resin.

A preferred embodiment of the invention employing mixed monoethylenically unsaturated monomers is a polymer made from a mixture of bis(chloromethyl)styrene in amounts from about 5% to about 99.4% by weight of the mixture, vinylbenzyl chloride in amounts from about 0.1% to about 94.5% by weight of the mixture, and a polyethylenically unsaturated crosslinker in amounts from about 0.5% to about 30% by weight of the mixture.

Other monoethylenically unsaturated monomers or mixtures thereof may replace all or part of the vinylbenzyl chloride in the above mixture. Examples of such monoethylenically unsaturated monomers include esters of acrylic and methacrylic acid such as methyl, ethyl, propyl, isobutyl, isopropyl, butyl, tertiary butyl, ethylhexyl, amyl, hexyl, octyl, decyl, dodecyl, cyclohexyl, isobornyl, benzyl, phenyl, alkylphenyl, ethoxymethyl, ethoxyethyl, ethoxypropyl, propoxymethyl, propoxyethyl, propoxypropyl, ethoxyphenyl, ethoxybenzyl, ethoxycyclohexyl, hydroxyethyl, and hydroxypropyl esters. Further examples include such monomers as ethylene, propylene, isobutylene, diisobutylene, styrene, ethylvinylbenzene, vinyltoluene, vinylbenzyl chloride, dicyclopentadiene, acrylonitrile, methacrylonitrile, acrylamide, methacrylamide, and diacetone acrylamide. Other examples include functional monomers such as vinylbenzene sulfonic acid, and vinyl esters, such as vinyl propionate, vinyl butyrate, vinyl laurate; additional vinyl monomers vinyl ketones such as vinyl isopropyl ketone, vinyl methyl ketone, vinyl ethyl ketone, vinyl n-butyl ketone, vinyl hexyl ketone, vinyl octyl ketone, and methyl isopropenyl ketone, vinyl aldehydes such as acrolein methacrolein, crotonaldehyde and vinyl ethers such as vinyl methyl ether, vinyl ethyl ether, vinyl propyl ether, vinyl isobutyl ether. Yet other examples are the corresponding neutral or half-acid half-esters or free diacids of the unsaturated dicarboxylic acids including itaconic, citraconic, aconitic, fumaric and maleic acids, substituted acrylamides such as N-monoalkyl, N,N-dialkyl and N-dialkylaminoalkyl acrylamides or methacrylamides where the alkyl groups may have from one to eighteen carbon atoms, such as methyl, ethyl, isopropyl, butyl, hexyl, cyclohexyl, octyl, dodecyl, hexadecyl and octadecyl. Additional examples are aminoalkyl esters of acrylic or methacrylic acid, such as $\beta$-dimethylaminoethyl, $\beta$-diethylaminoethyl, or 6-dimethylaminohexyl acrylates and methacrylates, alkylthioethyl methacrylates and acrylates such as ethylthioethyl methacrylates, vinylpyridines, such as 2-vinylpyridine, 4-vinylpyridine, 2-methyl-5-vinylpyridine and so on.

The following examples illustrate ways in which the invention has been practiced but are not to be construed as limiting the scope of the invention, except as indicated in the claims. Percent values given in the examples are all weight percent unless otherwise stated.

EXAMPLE 1

Preparation of Gel Polymer

An aqueous mixture of reaction modifiers and physical property modifiers was prepared by dissolving 2.3 grams of polyacrylic acid in 25 grams of water, adding 3.8 grams of boric acid and mixing with this solution a second mixture, which was prepared by mixing 0.11 grams of hydroxypropyl methylcellulose with 50 grams of boiling water and adding 85.6 grams of ice. The pH of the combined mixture was adjusted to 10.5 by the addition of 46 drops of 50% aqueous sodium hydroxide solution. To the mixture 0.22 grams of gelatin, predissolved in 25 grams of hot water was added.

A solution was prepared containing 14.05 grams of bis(chloromethyl)styrene, 0.95 grams of divinylbenzene and 0.30 grams of benzoyl peroxide, and this solution was charged to a 50-ml, 4-necked, round-bottomed flask fitted with a thermometer, nitrogen inlet tube, mechanical stirrer and condenser. To this flask was charged 22.5 grams of the aqueous mixture previously described, and the flask atmosphere was replaced, and was continually swept during the reaction, with nitrogen gas.

The reaction mixture was stirred at the rate of 394 rpm and was heated to 80° C., at which temperature it was maintained for 9.5 hours, following which it was heated to 90° C. and maintained at that temperature for one hour. The flask contents were allowed to cool to room temperature, and the resulting gel-form polymer beads were washed three times with methanol and then were dried. Elemental analysis showed 33.0 percent chlorine, compared to a theoretical 33.09 percent chlorine.

EXAMPLE 2

Preparation of Strong-Base, Gel Anion-Exchange Resin

A 100-milliliter, 4-necked, round-bottomed flask fitted with a thermometer, gas inlet tube, mechanical stirrer and condenser was charged with 14 grams of the polymer beads prepared in Example 1. The beads were allowed to swell in 30 milliliters of dichloroethane for about one-half hour, following which 35 milliliters of methanol were added to the flask, and the resulting slurry was heated to 60° C. with stirring and was maintained at that temperature. During a 1.5-hour period in which the flask contents were continuously stirred, 12.4 grams of gaseous trimethylamine were bubbled into the mixture in the flask. The stirring was continued for an additional 16.5-hour period; the temperature was maintained at 60° C. for the first 2.5 hours of this period, after which it was allowed to drop to ambient temperatures.

At the end of the reaction period the organic solvents were slowly distilled from the mixture by heating at atmospheric pressure; a constant volume was maintained in the flask throughout the distillation by the addition of water from an addition funnel. After the organic solvents were removed, the hydrated beads were washed four times with deionized water.

The anion exchange capacity of the resin prepared in Example 2, a strong-base, gel resin, was measured and found to be 4.81 milliequivalents per gram of resin. After one cycle of hydrating and drying, the resin was found to contain 97% whole resin beads and 3% cracked beads, which is evidence of excellent "wet/dry" physical stability. Elemental analysis of the resin showed 6.4 percent nitrogen and 27.6 percent chlorine, compared to theoretical values of 8.45 percent nitrogen and 21.4 percent chlorine. The solids content of the hydrated resin was 34.6 percent.

In a similar experiment using a copolymer crosslinked with 6 percent divinylbenzene and aminated at 60° C. for 16 hours, a gel, anion-exchange resin with a solids content of 40.5 percent and an ion exchange capacity of 5.05 milliequivalents per gram of resin was obtained.

EXAMPLE 3

Preparation of Macroreticular Polymer

An aqueous solution of reaction modifiers and physical property modifiers was prepared by dissolving 7.23 grams of 16% poly(dimethyldiallyl)ammonium chloride (PADMAC) and 1.87 grams of boric acid in 86 grams of water, and adjusting the pH of the solution to 10.5 by dropwise addition of a 50% aqueous sodium hydroxide solution; 20 drops were required. The pH-adjusted solution was mixed with 0.8 grams of gelatin previously dissolved in 50 grams of 60° C. water.

A solution was prepared by mixing 20.22 grams of bis(chloromethyl)styrene 2.26 grams of 79.6% divinylbenzene, 11.12 grams of methyl isobutyl carbinol, and 0.225 grams of benzoyl peroxide. This solution and 50.4 grams of the previously prepared aqueous solution were mixed in a 50-milliliter, 4-necked, round-bottomed flask fitted with a thermometer, nitrogen inlet tube, mechanical stirrer with Teflon blade, condenser, heating mantle and pot lifter. The flask was swept with nitrogen during the entire polymerization period. The flask contents were stirred at 394 rpm to keep then thoroughly mixed. The mixture was heated and maintained at a temperature of 80° C., and was stirred continuously for 8 hours. The remaining volatile organic materials, primarily methyl isobutyl carbinol, were removed by azeotropic distillation, and the resulting macroreticular polymer beads were washed three times with water, three times with methanol and were dried. Elemental analysis of the beads showed 28.95% chlorine, compared with the theoretical value of 31.79% chlorine.

EXAMPLE 4

Preparation of Strong-Base, Macroreticular Anion-Exchange Resin

A 2-liter, stainless-steel Parr bomb was charged with 6.74 grams of the polymer beads from Example 3, 50 milliliters of monochlorobenzene, and 250 milliliters of water. The mixture was stirred continuously during the following steps; it was heated to 50° C. and was maintained at that temperature for one hour to swell the polymer beads. The mixture was then cooled and maintained at 22° C., 250 milliliters of a 25% aqueous trimethylamine solution were added over a period of one hour, and the mixture was allowed to stand, with continuous stirring, at 22° C. for three hours. Stirring was then stopped, the bomb was sealed, heated to 90° C., pressurized to 45 pounds per square inch, and allowed to stand at that pressure and temperature for 16 hours. The bomb contents were cooled and transferred to a 1-liter, 3-necked, round-bottomed flask, the remaining volatile organic materials, primarily excess trimethylamine and monochlorobenzene, were distilled from the mixture, and the resin beads were washed three times with water.

The resulting, strong-base macroreticular anion-exchange resin had an anion-exchange capacity of 5.18 milliequivalents per gram, compared with a theoretical capacity of 5.85 milliequivalents per gram, and the solids content was 30.88%. The resin mass contained about 70% by volume of whole beads and about 30 % by volume of bead fragments. Elemental analysis of the resin showed 5.90% nitrogen and 15.0% chlorine, compared with theoretical values of 8.19% nitrogen and 20.76% chlorine.

EXAMPLE 5

Preparation of Macroreticular Polymer

An aqueous solution of reaction modifiers and physical property modifiers was prepared as described in Example 3. A solution was prepared by mixing 20.5 grams of bis(chloromethyl)styrene, 1.98 grams of 79.6% divinylbenzene, 11.12 grams of methyl isobutyl carbinol and 0.225 grams of benzoyl peroxide; this solution and 50.4 grams of the previously prepared, aqueous solution were mixed in a 50-milliliter, 4-necked, round-bottomed flask fitted with a stirrer with Teflon blade, condenser, heating mantle and pot lifter. The flask was swept with nitrogen during the entire polymerization period.

The flask contents were stirred at 394 rpm to keep them thoroughly mixed. The mixture was heated and maintained at 80° C. for 8 hours, with continuous stirring. The remaining volatile organic materials, primarily methyl isobutyl carbinol, were removed by azeotropic distillation, and the resulting macroreticular polymer beads were washed three times with water, three times with methanol, and were dried. Elemental analysis of the beads showed 29.4% chlorine, compared with a theoretical value of 32.2%.

EXAMPLE 6

Preparation of Weak-Base, Macroreticular Anion-Exchange Resin

A 100-milliliter, 4-necked, round-bottomed flask was charged with 11.24 grams of the macroreticular polymer beads from Example 5 and 25 milliliters of monochlorobenzene. The slurry was heated and maintained at 65° C. for 20 minutes, to swell the polymer beads. The flask contents were cooled to 12° C., and 25 milliliters of water and 12.24 grams of 50% aqueous sodium hydroxide solution were added. Over a period of ten minutes 17.2 grams of a 40% aqueous dimethylamine solution was added to the flask; the mixture was heated and maintained at 65° C. for 4 hours, and was cooled to room temperature. The flask contents were heated to 100° C. over a period of 5.5 hours, during which the volume was maintained at a constant level by water additions, to distill off volatile organic materials.

The resulting, weak-base, macroreticular anion-exchange resin had an anion-exchange capacity 6.52 milliequivalents per gram, compared with a theoretical value of 8.43 milliequivalents per gram, and the solids content was 27.3%. The resin mass contained about 90% by volume of the bead fragments. Elemental analysis showed 7.6% nitrogen, compared with a theoretical value of 11.8%.

EXAMPLE 7

Preparation of Gel Terpolymer and Strong-Base Resin Incorporating Vinylbenzyl Chloride Using the procedure of Example 1, a terpolymer of bis(chloromethyl)styrene, divinylbenzene and vinylbenzyl chloride, $CH_2 = CH - (C_6H_4) - CH_2Cl$, was prepared. The monomer solution contained 55.24 grams of bis(chloromethyl)styrene, 36.96 grams of vinylbenzyl chloride, 6.8 grams of divinylbenzene and 1.98 grams of benzoyl peroxide; this was mixed with 148.5 grams of aqueous mixture having the same composition as that of Example 1.

Using the procedure of Example 2, 99 grams of the resulting gel-form polymer beads were swollen in 300 milliliters of dichloroethane, slurried with 300 milliliters of methanol, and aminated with 127 grams of anhydrous trimethylamine.

The anion exchange capacity of the resulting strong-base, gel resin was found to be 4.89 milliequivalents per gram of resin, compared with a theoretical capacity of 5.43 milliequivalents per gram, and the solids content was 43.8% of the hydrated beads. The resin mass contained 99% by volume of whole beads and 1% by volume of bead fragments. Elemental analysis of the resin showed 6.11% nitrogen and 15.83% chlorine, compared with theoretical values of 7.6% nitrogen and 19.28% chlorine.

We claim:

1. A crosslinked copolymer resulting from copolymerizing a monomer mixture of
   (a) one or more monoethylenically unsaturated monomers, including bis-(chloromethyl)styrene which comprises at least about 5 weight percent of the mixture; and
   (b) a polyethylenically unsaturated monomer which is present at between about 0.5 and about 50 weight percent of the mixture.

2. The copolymer of claim 1 wherein the polyethylenically unsaturated monomer is selected from the group consisting of divinylpyridine, divinylnaphthalenes, divinylbenzene, trivinylbenzene, alkyl divinylbenzenes having 1-4 alkyl groups of 1-2 carbon atoms substituted in the benzene nucleus and alkyl trivinylbenzenes having 1-3 alkyl groups of 1-2 carbon atoms substituted in the benzene nucleus, and mixtures thereof.

3. The copolymer of claim 1 wherein the polyethylenically unsaturated monomer is present at between about 0.5 and about 30 percent by weight of the novel polymer.

4. The copolymer of claim 1 wherein the polymer is in the form of gellular beads.

5. The copolymer of claim 1 wherein the polymer is in the form of macroreticular beads.

6. The copolymer of claim 1 wherein the mixture comprises
   (a) about 5% to about 99.4% by weight of bis(-chloromethyl)styrene and from about 0.1% to about 94.5% by weight of at least one additional monoethylenically unsaturated monomer selected from vinylbenzyl chloride and styrene; and
   (b) about 0.5% to about 30% by weight of the polyethylenically unsaturated monomer.

7. The coploymer of claim 6 wherein the additional monoethylenically unsaturated monomer is vinylbenzyl chloride.

8. An amine functionalized anion exchange resin produced from a copolymer resulting from copolymerizing a monomer mixture of
   (a) one or more monoethylenically unsaturated monomers, including bis-(chloromethyl)styrene which comprises at least about 5 weight percent of the mixture; and
   (b) a polyethylenically unsaturated monomer which is present at between about 0.5 and about 50 weight percent of the mixture.

9. The resin of claim 8 wherein the polyethylenically unsaturated monomer is selected from the group consisting of divinylpyridine, divinylnaphthalenes, divinylbenzene, trivinylbenzene, alkyl divinylbenzenes having 1-4 alkyl groups of 1-2 carbon atoms substituted in the benzene nucleus, and alkyl trivinylbenzenes having 1-3 alkyl groups of 1-2 carbon atoms substituted in the benzene nucleus, and mixtures thereof.

10. The resin of claim 8 wherein the polyethylenically unsaturated monomer is present at between about 0.5 and about 30 weight percent of the polymer.

11. The resin of claim 8 wherein the amine functionality is introduced to the polymer by an alkyl amine having 2-3 alkyl groups which may be different from one another, and which contain 1-5 carbon atoms each.

12. The resin of claim 8 wherein the resin is in the form of gellular beads.

13. The resin of claim 8 wherein the resin is in the form of macroreticular beads.

14. The resin of claim 8 wherein the mixture comprises
   (a) from about 5% to about 99.4% by weight of bis-(chloromethyl)styrene and from about 0.1% to about 94.5% by weight of at least one additional monoethylenically unsaturated monomer selected from vinylbenzyl chloride and styrene; and
   (b) about 0.5% to about 30% by weight of the polyethylenically unsaturated monomer.

15. The resin of claim 14 wherein the additional monoethylenically unsaturated monomer is vinylbenzyl chloride.

16. A process for preparing a polymer of crosslinked bis(chloromethyl)styrene capable of being converted into an anion exchange resin, the process comprising copolymerizing by a suspension polymerization reaction a monomer mixture containing from about 5% to about 99.4% by weight of bis(chloromethyl)styrene, from about 0.1% to about 94.5% by weight of vinylbenzyl chloride and from about 0.5% to about 30% by weight of a polyethylenically unsaturated crosslinker.

17. A process for preparing an amine functionalized anion exchange resin comprising copolymerizing by a suspension polymerization reaction a monomer mixture containing from about 5% to about 99.4% by weight of bis(chloromethyl)styrene, from about 0.1% to about 94.5% by weight of vinylbenzyl chloride, and from about 0.5% to about 30% by weight of a polyethylenically unsaturated crosslinker, and aminating the copolymer with an alkylamine having 2–3 alkyl groups which may be different from one another and which contain 1–5 carbon atoms each.

* * * * *